US012731797B2

(12) United States Patent
Glanz et al.

(10) Patent No.: US 12,731,797 B2
(45) Date of Patent: Sep. 8, 2026

(54) BIPOLAR PLATE FOR A FUEL CELL SYSTEM

(71) Applicant: Robert Bosch GmbH, Stuttgart (DE)

(72) Inventors: Leonore Glanz, Asperg (DE); Manuel Schneiter, Boeblingen (DE)

(73) Assignee: Robert Bosch GmbH, Stuttgart (DE)

( * ) Notice: Subject to any disclaimer, the term of this patent is extended or adjusted under 35 U.S.C. 154(b) by 521 days.

(21) Appl. No.: 18/249,599

(22) PCT Filed: Oct. 14, 2021

(86) PCT No.: PCT/EP2021/078406
§ 371 (c)(1),
(2) Date: Apr. 19, 2023

(87) PCT Pub. No.: WO2022/084132
PCT Pub. Date: Apr. 28, 2022

(65) Prior Publication Data

US 2023/0402620 A1 Dec. 14, 2023

(30) Foreign Application Priority Data

Oct. 20, 2020 (DE) ..................... 10 2020 213 210.0

(51) Int. Cl.
*H01M 8/0258* (2016.01)
*H01M 8/0254* (2016.01)

(52) U.S. Cl.
CPC ....... *H01M 8/0258* (2013.01); *H01M 8/0254* (2013.01)

(58) Field of Classification Search
CPC ............. H01M 8/0254; H01M 8/0258; H01M 8/0263; H01M 8/0265; H01M 8/0267
See application file for complete search history.

(56) References Cited

U.S. PATENT DOCUMENTS

2006/0003206 A1 1/2006 Sugiura et al.
2006/0046130 A1 3/2006 Lai
(Continued)

FOREIGN PATENT DOCUMENTS

CN 102142562 A 8/2011
DE 102010039276 A1 3/2011
(Continued)

OTHER PUBLICATIONS

Translation of International Search Report for Application No. PCT/EP2021/078406 dated Feb. 9, 2022 (2 pages).

*Primary Examiner* — Kaj K Olsen
(74) *Attorney, Agent, or Firm* — Michael Best & Friedrich LLP

(57) ABSTRACT

The invention relates to a bipolar plate (100) for a fuel cell system (1), having: a cathode-side plate (10), which on a first side (11) has a first channel structure (K1) for an oxygen-containing reactant (O2) and
on a second side (12) has a second channel structure (K2) for a coolant (KM), and an anode-side plate (20),
which on a first side (21) has a first channel structure (A1) for a fuel-containing reactant (H2) and on a second side (22) has a second channel structure (A2) for a coolant (KM), the cathode-side plate (10) and the anode-side plate (20) bearing against one another by means of the second sides (12, 22) for the coolant (KM). To this end, in accordance with the invention, the first channel structure (K1) of the cathode-side plate (10) differs geometrically from the second channel structure (K2) of the cathode-side plate (10).

9 Claims, 1 Drawing Sheet

(56) References Cited

U.S. PATENT DOCUMENTS

| | | | | |
|---|---|---|---|---|
| 2008/0280177 | A1 * | 11/2008 | Ose | H01M 8/2483 96/4 |
| 2010/0285384 | A1 * | 11/2010 | Nakagawa | H01M 8/0263 429/479 |
| 2014/0057194 | A1 | 2/2014 | Wilkosz | |
| 2017/0110740 | A1 * | 4/2017 | Gurney | H01M 8/0265 |
| 2018/0241049 | A1 * | 8/2018 | Gruenwald | H01M 8/0247 |
| 2019/0229347 | A1 * | 7/2019 | Scholz | H01M 8/04134 |

FOREIGN PATENT DOCUMENTS

| | | | |
|---|---|---|---|
| DE | 102015205295 | A1 | 9/2016 |
| DE | 102016200398 | A1 | 7/2017 |
| JP | H0636780 | A | 2/1994 |
| JP | 2003178776 | A | 6/2003 |
| JP | 2008103168 | A | 5/2008 |
| JP | 2010073622 | A | 4/2010 |
| JP | 2011258323 | A | 12/2011 |
| JP | 2020047483 | A | 3/2020 |
| WO | 2014185193 | A1 | 11/2014 |

* cited by examiner

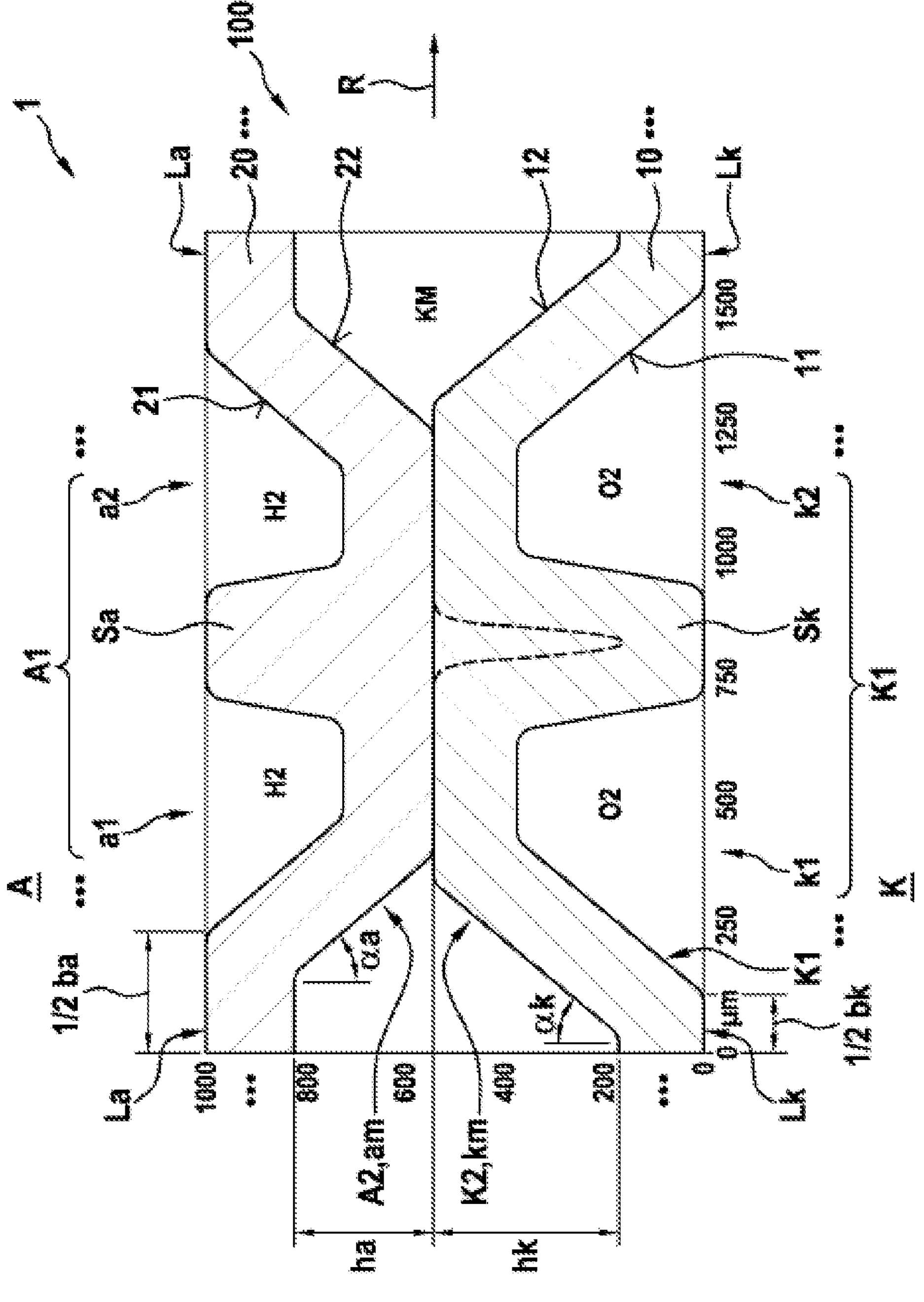

BIPOLAR PLATE FOR A FUEL CELL SYSTEM

BACKGROUND

The invention relates to a bipolar plate for a fuel cell system, the bipolar plate comprising a cathode-side plate, which on a first side has a first channel structure for an oxygen-containing reactant and on a second side has a second channel structure for a coolant, and an anode-side plate, which on a first side has a first channel structure for a fuel-containing reactant and on a second side has a second channel structure for a coolant, the cathode-side plate and the anode-side plate bearing against one another by means of the second sides. In addition, the invention relates to a fuel cell system.

Bipolar plates for fuel cells are generally known. The distribution channels for the reactants and the coolant on the bipolar plates are formed, for example, by the embossing of planar plates. In the design of the distribution channels, several optimization problems usually have to be considered. On the one hand, the hydraulic diameter for the reactants must be optimized so that the pressure drop when viewed in the flow direction of the reactants does not become too high. On the other hand, the height of the bipolar plates must be reduced in order for the power density of the system to be increased. Furthermore, the width of the support surfaces on the membrane-electrode units, in particular on the cathode side of the system, must be reduced so that the losses during the mass transport of the reactants do not become too high at peak loads. In addition, the width of the channels themselves must be reduced so that the pressure distribution in the middle of the channels does not become too low.

SUMMARY

According to a first aspect, the invention provides: a bipolar plate for a fuel cell system. According to a second aspect, the invention provides: a corresponding fuel cell system. Of course, features and details described in connection with the individual aspects according to the invention also apply in connection with the other aspects according to the invention and respectively vice versa, so that with respect to the disclosure, mutual reference to the individual aspects of the invention is or can always be made.

According to the first aspect, the present invention provides: a bipolar plate for a fuel cell system, having the following elements: a cathode-side plate, which on a first side has a first channel structure for an oxygen-containing reactant or an oxidant and on a second side has a second channel structure for a coolant, and an anode-side plate, which on a first side has a first channel structure for a fuel-containing reactant and on a second side has a second channel structure for a coolant, the cathode-side plate and the anode-side plate bearing against one another by means of the second sides for the coolant. To this end, in accordance with the invention, the first channel structure of the cathode-side plate differs geometrically from the second channel structure of (the same) cathode-side plate.

A fuel cell system in the sense of the invention can comprise a plurality of fuel cells each separated from one another by a bipolar plate and arranged in the form of a stack. From the end sides, the stack can be bounded by monopolar end plates.

The channel structures in the sense of the invention can be formed, for example, by means of reshaping or ductile shaping, such as extrusion, extrusion molding, deep-drawing, and bending into planar plates that will later serve as cathode-side plates or anode-side plates. In addition, finished plates can be produced by casting in a molding tool.

When a classic grooved structure is introduced into a planar plate, for example embossed, such a grooved structure has depressions on one side of the plate and corresponding elevations on the other side of the plate. In this respect, the invention speaks of channel structures that are configured so as to be geometrically identical on both sides of the formed plate.

The invention deliberately provides for a geometrically different configuration of the first channel structure on the first side of the cathode-side plate and of the second channel structure on the second side of the cathode-side plate. A geometrically different configuration means, in the sense of the invention, that the first channel structure on the cathode-side plate does not need to represent an exact negative image of the second channel structure. This means, for example, that, with respect to one side of the cathode-side plate, a depression on the other side of the cathode-side plate does not have to simultaneously correspond to an elevation, in particular only one elevation, or vice versa.

In the context of the invention, two reactant channels can follow the cathode-side plate adjacent to each coolant channel. In other words, two channels for the oxygen-containing reactant can be provided on the cathode-side plate alternately after each channel for the coolant. Thus, according to the invention, two oxidant channels can be provided for each coolant channel. In particular, the invention can provide that the channels for the oxygen-containing reactant are split in two or doubled. In the context of the invention, the channels for the oxygen-containing reactant can be separated from one another by a web, which can serve as an additional landing when supported on a cathode side of a membrane electrode unit.

On the anode-side plate, the channel structures can be shaped geometrically the same as well as geometrically different within the scope of the invention.

Using the invention, the second channel structure on the cathode-side plate can provide for a large hydraulic diameter of the coolant channel. At the same time, using the invention, it can be ensured that small landings for support on the cathode side of the membrane electrode unit can be provided on the first side of the cathode-side plate. In addition, using the invention, it can be possible to use greater draft angles in order to form the coolant channels on the cathode-side plate.

Further, in a bipolar plate, the invention can provide that the cathode-side plate alternately comprises a channel for the coolant and two channels for the oxygen-containing reactant, when viewed in a direction transverse to individual channels of the first channel structure and the second channel structure. In other words, in a bipolar plate, the invention can provide that the first channel structure of the cathode-side plate comprises double and/or split-in-two channels for the oxygen-containing reactant, and/or that the second channel structure of the cathode-side plate comprises simple channels for the coolant. Thus, relatively wide channels can be provided for the coolant in order to reduce pressure losses in the direction of flow of the coolant. At the same time, smaller landings to be supported on the cathode side of the membrane electrode unit can thus be provided in order to avoid product water buildup under the landings and to allow a better pressure distribution along the cathode-side plate when pressing the fuel cells into a stack.

Furthermore, in the case of a bipolar plate, the invention can provide that the double channels of the first channel structure are separated from one another by a web. Advantageously, the web between the oxidant channels can form a central support column in order to achieve an improved pressure distribution along the cathode-side plate when compressing the fuel cells into a stack. The central landing under the web can be rounded, for example.

Furthermore, in a bipolar plate, the invention can provide that the double channels of the first channel structure are formed by two independently embossed grooves. Thus, the cathode-side plate can be provided continuously with a substantially identical material thickness. In this way, the cathode-side plate can be produced simply and inexpensively, for example by means of a ductile shaping.

In addition, in a bipolar plate, the invention can provide that the first channel structure of the anode-side plate is geometrically different from the second channel structure of the anode-side plate. It is contemplated that the anode-side plate can be formed similarly to the cathode-side plate. It can also be provided that the anode-side plate, when viewed in a direction transverse to individual channels of the first channel structure and the second channel structure, can alternately comprise a channel for the coolant and two channels for the fuel-containing reactant. Advantageously, the two plates of the bipolar plate can be placed on top of one another, such that the bars in the double reactant channels overlap one another. In this way, wider support surfaces can be produced on the contact surfaces between the two plates of the bipolar plate. Thus, the plates can be prevented from slipping into one another and nesting together. Also, the electrical contact losses between the plates can thus be reduced. Furthermore, due to the wider support surfaces in the middle of the reactant channels, the height of the channels can be reduced.

However, it is also conceivable that the first channel structure of the anode-side plate and the second channel structure of the anode-side plate are configured so as to be geometrically identical. Since the anode side of a fuel cell does not have the problem of accumulations of the product water, and the fuel-containing reactant is provided at a higher concentration than the oxygen-containing reactant, a classic, cost-effective plate can be inserted on the anode side, which, in view of one side, has depressions reflecting the protrusions corresponding to the other side of the plate.

In addition, for a bipolar plate, the invention can provide that the first channel structure on the anode-side plate can have landings below the channels for the coolant configured so as to be supported on an anode of a corresponding fuel cell of the fuel cell system, and that the first channel structure on the cathode-side plate can in turn have landings below the channels for the coolant configured so as to be supported on a cathode of an adjacent fuel cell of the fuel cell system, wherein the landings on the anode-side plate can have a greater width than a width of landings on the cathode-side plate. In this way, the coolant channels can be substantially displaced to the anode side of the bipolar plate. As a result, wider channels for the oxygen-containing reactant can in turn be enabled on the cathode-side plate.

Further, for a bipolar plate, the invention can provide that a deformation angle of channels for the coolant on the anode-side plate can be less than a deformation angle of channels for the coolant on the cathode-side plate. In this way, the landings can be made smaller on the cathode-side plate, because this is precisely where the product water can accumulate under the landings.

Furthermore, for a bipolar plate, the invention can provide that a height of channels for the coolant on the anode-side plate is less than a height of channels for the coolant on the cathode-side plate. Thus, the coolant channels can also be substantially displaced to the anode side of the bipolar plate.

According to the second aspect, the present invention provides: a fuel cell system having at least one bipolar plate, which can be configured as described above. Using the fuel cell system according to the invention, the same advantages can be achieved as described above in connection with the bipolar plate according to the invention. In the present case, reference to these advantages is made in full.

BRIEF DESCRIPTION OF THE DRAWINGS

The invention and its further developments, as well as its advantages, will be explained in further detail below with reference to drawings. The FIGURES show schematically:

FIG. 1 a bipolar plate in the sense of the invention.

DETAILED DESCRIPTION

FIG. 1 shows a fuel cell system 100 in the sense of the invention, which is designed for a fuel cell system 1. The fuel cell system 1 having at least one corresponding bipolar plate 100 also constitutes an aspect of the invention. The fuel cell system 1 in the sense of the invention can comprise a plurality of fuel cells provided in a stack. A bipolar plate 100 in the sense of the invention is arranged between two respective fuel cells. Mostly monopolar plates are provided on the end sides of the stack for limiting the stack.

The bipolar plate 100 in the sense of the invention comprises the following elements: a cathode-side plate 10, which on a first side 11 has a first channel structure K1 for an oxygen-containing reactant O2 or an oxidant and on a second side 12 has a second channel structure K2 for a coolant KM, and an anode-side plate 20, which on a first side 21 has a first channel structure A1 for a fuel-containing reactant H2 and on a second side 22 has a second channel structure A2 for a coolant KM, the cathode-side plate 10 and the anode-side plate 20 bearing against one another by means of the second sides 12, 22 for the coolant KM.

The invention provides that the first channel structure K1 of the cathode-side plate differs geometrically from the second channel structure K2 of (the same) cathode-side plate 10.

The invention deliberately provides for geometrically different channel structures K1, K2 on the first side 11 of the cathode-side plate 10 and on the second side 12 of the cathode-side plate 10. That is to say, in the sense of the invention, the first channel structure K1 on the first side 11 of the cathode-side plate 10 need not be an accurate negative image of the second channel structure K2 on the second side 12 of the cathode-side plate 10. In other words, a depression on one side of cathode-side plate 10 does not need to reflect an elevation, in particular only one elevation, on the other side of cathode-side plate 10, or vice versa.

In the context of the invention, two channels k1, k2 for the oxygen-containing reactant O2 can be arranged on the cathode-side plate 10 adjacent to each coolant channel km. Thus, two oxidant channels k1, k2 can be provided for each coolant channel km.

As shown in FIG. 1, the channels k1, k2 can be configured split in two or doubled for the oxygen-containing reactant O2. It is contemplated that the channels k1, k2 for the oxygen-containing reactant O2 can be separated from one another by a web Sk, which can serve as an additional landing Lk when supported on a cathode side of a membrane electrode unit, or, stated simply, on a cathode K of a fuel cell. At the same time, however, it is also conceivable that the web Sk can be provided by a fold between two closely abutting grooves in the cathode-side plate as implied in FIG. 1 by a dashed line.

On the anode-side plate 20, the channel structures A1, A2 can be geometrically the same (not shown for the sake of simplicity) as well as geometrically different (as shown in FIG. 1).

The bipolar plate 100 according to the present invention can provide for a large hydraulic diameter of the coolant channel KM in order to reduce pressure losses in the direction of flow of the coolant KM. At the same time, the bipolar plate 100 according to the invention can allow relatively small landings Lk to be provided on the first side 11 of the cathode-side plate 10 so as to be supported on the cathode K of a corresponding fuel cell in order to avoid product water accumulations among the landings Lk and to allow for better pressure distribution along the cathode-side plate 10 when compressing the fuel cells into a stack.

As mentioned above, and as shown in FIG. 1, the first channel structure A1 of the anode-side plate 20 can also geometrically differ from the second channel structure A2 of the anode-side plate 20. It is contemplated that the anode-side plate 20 can be configured similarly to the cathode-side plate 10. The anode-side plate 20, when viewed in a direction R transverse to individual channels a1, a2, km of the first channel structure A1 and the second channel structure A2, can alternately comprise a channel am for the coolant KM and two channels a1, a2 for the fuel-containing reactant H2.

As shown in FIG. 1, the channel am for the coolant KM at the anode-side plate 20 can transition fluidly into the channel km for the coolant KM at the cathode-side plate 10, or they can form a common coolant channel.

As shown in FIG. 1, the two plates 10, 20 of the bipolar plate 100 can be placed one on top of the other such that the bars Sa, Sk in the double reactant channels k1, k2 and a1, a2 lie one above the other. In this way, wider support surfaces can be provided on the contact surfaces between the two plates 10, 20 of the bipolar plate 100 in order to prevent the plates 10, 20 from slipping into one another and nesting together. Also, the electrical contact losses between the plates 10, 20 can thus be reduced. Due to the wider support surfaces in the middle of the double reactant channels k1, k2 and a1, a2, the height of the channels can still be reduced.

At the same time, however, it is also conceivable, which is not shown in FIG. 1 merely for the sake of simplicity, that the first channel structure A1 of the anode-side plate 20 and the second channel structure A2 of the anode-side plate 20 can be geometrically identical. This is possible because, on the anode side A of a fuel cell, the problem of accumulations of the product water does not arise, and the fuel-containing reactant H2 is provided at a higher concentration than the oxygen-containing reactant O2, and thus a classic plate can be inserted on the anode side A, which has depressions on one side of the anode-side plate 20 reflecting the elevations corresponding to the other side of the anode-side plate 20.

As indicated in FIG. 1, the first channel structure A1 on the anode-side plate 20 can have landings La below the channels am for the coolant KM configured so as to be supported on an anode A of a corresponding fuel cell of the fuel cell system 1. The first channel structure K1 on the cathode-side plate 10 can in turn have landings Lk below the channels km for the coolant KM configured so as to be supported on a cathode K of an adjacent fuel cell of the fuel cell system 1. In so doing, the landings La on the anode-side plate 20 can have a greater width ba than a width bk of landings Lk on the cathode-side plate 10. In this way, the coolant channels can be substantially displaced to the anode side A of the bipolar plate 100. As a result, wider channels k1, k2 for the oxygen-containing reactant O2 can in turn be enabled on the cathode-side plate 10.

As further indicated in FIG. 1, a deformation angle αa of channels am for the coolant KM on the anode-side plate 20 can be less than a deformation angle αk of channels km for the coolant KM on the cathode-side plate 10. In this way, the landings Lk can be made smaller on the cathode-side plate 10, because this is precisely where the product water can accumulate under the landings Lk. In this way, in particular at high power densities, mass transport losses of the oxygen-containing reactant O2 can be reduced.

Further, FIG. 1 shows that a height ha of channels am for the coolant KM at the anode-side plate 20 can be less than a height hk of channels km for the coolant KM at the cathode-side plate 10. Thus, the coolant channels can also be substantially displaced to the anode side A of the bipolar plate 100.

The numbers shown in FIG. 1 are exemplary only. The above description of the FIG. 1 describes the present invention solely in the context of examples. Of course, individual features of the embodiments can be freely combined with one another, insofar as technically sensible, without leaving the scope of the invention.

The invention claimed is:

1. A bipolar plate (100) for a fuel cell system (1), the bipolar plate (100) comprising:
- a cathode-side plate (10), which on a first side (11) has a first channel structure (K1) for an oxygen-containing reactant (O2) and on a second side (12) has a second channel structure (K2) for a coolant (KM), and
- an anode-side plate (20), which on a first side (21) has a first channel structure (A1) for a fuel-containing reactant (H2) and on a second side (22) has a second channel structure (A2) for a coolant (KM),
- the cathode-side plate (10) and the anode-side plate (20) bearing against one another at the second sides (12, 22),
- wherein the first channel structure (K1) of the cathode-side plate (10) defines a shape and the second channel structure (K2) of the cathode-side plate (10) defines a shape that is different from the shape defined by the first channel structure (K1),
- wherein the first channel structure (K1) of the cathode-side plate (10) includes double and/or split-in-two channels (k1, k2) for the oxygen-containing reactant (O2),
- wherein the second channel structure (K2) of the cathode-side plate (10) has channels (km) for the coolant (KM),
- wherein when viewed along a line in a direction (R) transverse to and passing through the first channel structure (K1) and the second channel structure (K2), the double and/or split-in-two channels (k1, k2) are arranged next to one another before arriving at a channel (km) of the channels (km).

2. The bipolar plate (100) according to claim 1, wherein the channels (k1, k2) of the first channel structure (K1) are separated from one another by a web (Sk), and/or wherein the channels (k1, k2) of the first channel structure (K1) are formed by two independently embossed grooves.

3. The bipolar plate (100) according to claim 1, wherein the first channel structure (A1) of the anode-side plate (20) defines a shape and the second channel structure (A2) of the anode-side plate (20) defines a shape that is different from the shape defined by the first channel structure (A1).

4. The bipolar plate (100) according to claim 3, wherein the first channel structure (A1) and the second channel structure (A2) of the anode-side plate (20) includes channels (am) for the coolant (KM) and includes two channels (a1, a2) for the fuel-containing reactant (H2), wherein when viewed in a direction (R) transverse to and passing through the first channel structure (A1) and the second channel structure (A2) of the anode-side plate (20), the two channels (a1, a2) of the anode-side plate are arranged next to one another before arriving at a channel (am) of the channels (am).

5. The bipolar plate (100) according to claim 4, wherein the first channel structure (A1) on the anode-side plate (20) has landings (La) under the channels (am) for the coolant (KM) on the anode-side plate (20), which are configured so as to be supported on an anode (A) of a fuel cell of the fuel cell system (1), and wherein the first channel structure (K1) on the cathode-side plate (10) has landings (Lk) under the channels (km) for the coolant (KM), which are configured so as to be supported on a cathode (K) of a fuel cell of the fuel cell system (1), wherein the landings (La) on the anode-side plate (20) have a greater width (ba) than a width (bk) of landings (Lk) on the cathode-side plate (10).

6. The bipolar plate (100) according to claim 4, wherein a deformation angle (αa) of the channels (am) for the coolant (KM) on the anode-side plate (20) is smaller than a deformation angle (αk) of channels (km) for the coolant (KM) on the cathode-side plate (10).

7. The bipolar plate (100) according to claim 1, wherein the first channel structure (A1) of the anode-side plate (20) and the second channel structure (A2) of the anode-side plate (20) are configured so as to be geometrically identical.

8. The bipolar plate (100) according to claim 1, wherein a height (ha) of channels (am) for the coolant (KM) on the anode-side plate (20) is smaller than a height (hk) of channels (km) for the coolant (KM) on the cathode-side plate (10).

9. A fuel cell system (1) having at least one bipolar plate (100) according to claim 1.

* * * * *